March 17, 1953 — O. JOHNSON — 2,631,862
TRAILER HITCH AND SUPPORT
Filed Jan. 25, 1949 — 2 SHEETS—SHEET 1
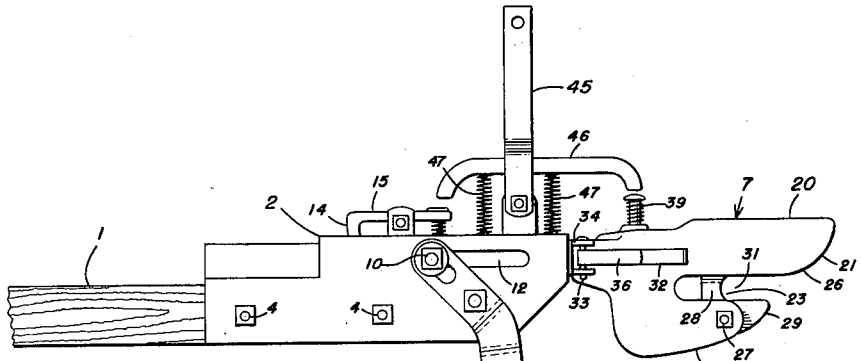
FIG. 1
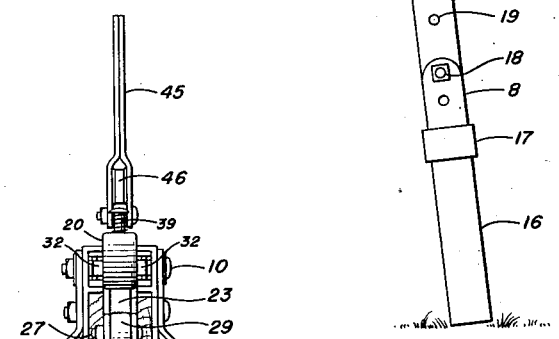
FIG. 2
FIG. 3
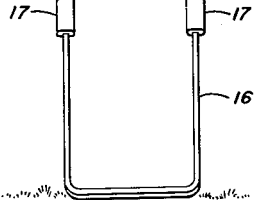
Inventor:
Oliver Johnson
By [signature]
his Attorney

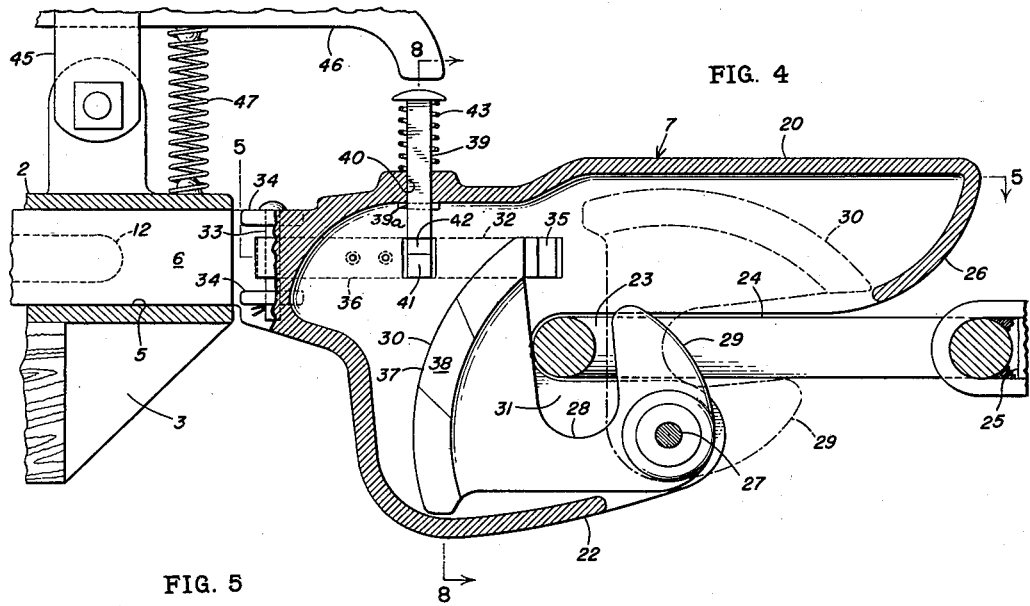

Patented Mar. 17, 1953

2,631,862

UNITED STATES PATENT OFFICE 2,631,862

TRAILER HITCH AND SUPPORT

Oliver Johnson, Absaraka, N. Dak., assignor to Fred Gavin, Absaraka, N. Dak.

Application January 25, 1949, Serial No. 72,671

9 Claims. (Cl. 280—33.44)

This invention relates generally to couplings and more particularly to hitches for attaching trailers to tractors.

The primary object of the invention is to provide an improved trailer hitch for automatically attaching trailers to tractors.

Another object of the invention is to provide a trailer hitch incorporating means automatically operable on uncoupling to support the hitch at coupling level.

An additional object of the invention is to provide a hitch incorporating supporting means for maintaining the hitch at coupling level, wherein the supporting means is moved into and out of supporting position on uncoupling and coupling of the trailer.

A further object of the invention is to provide a trailer hitch incorporating a collapsible stand having means for positively locking the stand in supporting and unsupporting position.

Yet another object of the invention is to provide in a trailer hitch an improved automatic coupler of the knuckle type incorporating releasing means which is automatically reset on opening of the coupler.

A still further object of the invention is to provide an improved trailer hitch having means for adjusting the hitch for use with trailers of different size.

Other objects and advantages of the invention will appear hereinafter in the detailed description, be particularly pointed out in the appended claims, and illustrated in the accompanying drawings, in which:

Figure 1 is a side elevational view of a preferred embodiment of the hitch of the present invention, showing the hitch in tongue supporting position, Figure 2 is a front elevational view of the hitch of Figure 1, Figure 3 is a side elevational view partly in section, showing the coupled position of the hitch, Figure 4 is a fragmentary side elevational view on an enlarged scale of the coupler and associated parts of the hitch, showing their relative positions immediately before uncoupling, Figure 5 is a horizontal sectional view taken along the lines 5—5 of Figure 4, Figure 6 is a fragmentary horizontal view, partly in section, showing the relative positions of the parts on unlocking of the coupler, Figure 7 is a view similar to Figure 6 showing the relative positions of the parts during opening movement of the coupler knuckle, and Figure 8 is a vertical sectional view taken along the lines 8—8 of Figure 4.

Referring now in detail to the drawings in which like reference characters designate like parts, the improved hitch has been illustrated attached to a tongue or draft bar 1 of a drawn device (not shown). While of wide application, the hitch is particularly adapted for use with drawn devices of the trailer or farm implement type, the front end of which is designed to be supported by its tractor or other powered unit and thus drops below coupling level when the device is uncoupled. As will become apparent hereinafter the hitch of the present invention enables such drawn implements to be coupled as readily as those of the self-supporting type.

For attachment to the tongue 1 the hitch is provided with a casing or housing 2 having a tongue end receiving or embracing channel or groove 3. In the illustrated embodiment this channel is of downwardly opening U-shape and adapted to be slid over the end of the tongue to which it is removably attached or anchored, as by bolts 4. Although shown applied directly to the tongue, the housing may be adjusted for tongues of different size and shape by the use of suitable shims or adapters.

Also formed in the housing is a sleeve, passage or tunnel 5, which here overlies the channel 3 and is in longitudinal alignment therewith. This channel is adapted to slidably receive a shank 6 of a coupler 7. To prevent twisting of the coupler, both shank and passage are preferably rectangular in cross-section and have a comparatively tight sliding fit to minimize or prevent relative angling movement therebetween.

A particular feature of the hitch of the present invention is its ability to maintain the coupler 7 at coupling height when the implement to which the hitch is applied is uncoupled. This is accomplished by the provision of a stand or support 8 having legs 9 which are pivotally attached intermediate their ends on opposite sides of the casing 2 and may be so attached by one of the anchor bolts 4. Adjacent their upper ends above their pivot points the legs are each slotted to receive one of a pair of trunnions or bearing members 10 which may be formed as the opposite ends of a bearing shaft or bolt 11 extending transversely through and journaled in the shank 6. Intermediate the arms and shanks, the intervening side walls of the sleeves 5 are slotted to provide longitudinally disposed elongated slots 12 through which the trunnions project, the slots also serving to limit the extent of both the pivotal or hinging movement of the stand 8 and the reciprocable movement of the shank 6 relative to the casing.

With the above bearing connection between the stand and coupler, reciprocal movement of the latter is converted into pivotal movement of the former, enabling the position of the coupler to actuate or control the angular disposition of the stand relative to the casing and associated tongue 1. Thus, when the shank 6 of the coupler is telescoped within its sleeve, the portion of the stand below its pivot point is substantially vertical, while, when the shank is withdrawn, the stand is swung or tilted back to a substantially horizontal position along the tongue, these positions being shown in Figures 1 and 3, respectively. To hold or maintain the stand in both down and retracted positions, spaced recesses 13 are formed in the upper face of the shank, each corresponding to one of the two positions and both adapted to engage a downstanding finger or detent 14 forming part of a spring pressed or urged lock bar or lever 15 mounted on the top of the casing.

Since the coupling height may vary for different tractors, the length of the stand is made adjustable. This may be achieved through use of a U-shaped extension or foot 16, projectible or extensible relative to the legs 9 and slidably connected thereto, as by the illustrated collars and bolts, 17 and 18, respectively. For such connection adjustment of the length of the stand to the desired extent is accomplished through a series of spaced positioning holes 19.

Forwardly of the shank 6 and preferably formed integrally therewith, is the head 20 of the coupler 7. Having widest application for hitching or coupling tongued drawn vehicles to tractors, and the latter normally employing a ring or other link as its connecting means, the illustrated hitch is provided with a coupler of the link type. As shown, the coupler has vertically spaced upper and lower jaws 21 and 22, respectively, including therebetween a forwardly opening coupling slot, guideway or recess 23 for receiving a ring or like link 24 carried by the draw-bar 25 of a tractor (not shown). For use with either fixedly or swivelly mounted tractor links, the upper jaw or guard arm 21 preferably projects forwardly beyond or overhangs the lower jaw and has an arcuately convex front face or guiding portion 26 for guiding the link into the coupling slot 23.

Pivotally mounted in the hollow coupler head 20 through a substantially horizontally disposed pivot or knuckle pin 27 which extends between and is carried by the opposite side walls of the lower jaw, is a vertically swinging or pivoting knuckle or hook 28. This knuckle has a nose 29 and a tail 30, both normally upstanding and including therebetween a normally upwardly opening locking space or slot 31 of a configuration corresponding to that of the coupling slot 23.

As shown in Figure 4, the knuckle 28 in normal, coupled or locked position is disposed such that the nose 29 interrupts or blocks the coupling slot forwardly of its inner end thereby preventing egress of the connecting ring 24 therefrom, while the tail 30 is disposed rearwardly of the slot. On rotation of the knuckle about the knuckle pin 27 to the open, coupling or unlocked position, indicated diagrammatically in the same figure, the tail and nose occupy positions, respectively, above and below the coupling slot, with the rear or striking end of the locking slot 31 disposed across the coupling slot in the path of the ring. Thus, with the coupler open, the connecting ring on entering the coupling slot, will strike against the confronting arcuate rear end of the locking slot in the knuckle, causing the latter to pivot or rotate to closed or coupled position, while forward movement of the ring from coupled position by striking against the confronting face of the nose will pivot the knuckle to open position. If the coupler is closed when not connected to a tractor, the knuckle may, of course, be rotated manually to open position.

For locking the knuckle 28 in closed position, locking means are provided in the form of a pair of pivoted latches 32, pivotally mounted or attached to either side of the coupler head 20, as by pins or keys 33 carried by vertically spaced lugs or ears 34 formed integrally with the coupler. Adjacent the forward ends of the latches or latch arms 32 are integral instanding hooks 35, which project through appropriate openings in the side walls of the head and are adapted to lie in the path of the tail piece 30 of the knuckle, being yieldably held in that position by springs or other resilient means 36. For cooperating with the hooks, the end or peripheral portion of the tail is in the form of an arcuate shoe 37, having its side or bearing faces 38 bevelled or tapered inwardly toward either end and substantially parallel therebetween. So formed, the tail exerts a cam action to cam or pivot the latches out and in as the knuckle is rotated. At the inner end of movement or closed position of the knuckle, the hooks 35 slide off the shoe 37 and overlie and embrace the forward face of the tail, thereby effectively locking the knuckle in coupled or closed position and preventing egress of the tractor ring 29.

For releasing the knuckle from locked position and permitting opening or unlocking of the coupler, there is reciprocably mounted on the coupler head 20, a vertically disposed release plunger or member 39 projecting through a recess 40 in the upper wall of the coupler. While the shank of the plunger and the recess may be of any desired configuration, both are of rectangular cross-section in the illustrated embodiment. At or adjacent its lower end, the plunger has its side faces bevelled downwardly to form a downwardly directed wedge 41 and is necked or kerfed thereabove to provide notches or kerfs 42. With the plunger yieldably depressible against the force of a coil or other spring 43 and limited in its upward movement by suitable means, such as the illustrated cotter pin 39a, the wedge 41 normally lies between and at the level of the latches 32 and is movable therebelow on depressing of the plunger.

To transmit movement of the release plunger 39 to the latches 32, the latter are provided with instanding release fingers 44, having their upper faces adjacent their inner ends bevelled correspondingly to those of the wedge. Referring to Figures 5–8, it will be seen that with the latch in knuckle locking position the confronting bevelled faces abut against each other with the ends of the fingers almost touching. However, when the plunger is depressed, the wedge forces the fingers apart, imparting corresponding outward pivotal movement to the latches, until the ends of the fingers drop into the notches 42, locking the plunger in down position. In process, the hooks 35 are moved outwardly clear of the forward face of the tail 30, unlocking the knuckle 28. As the knuckle rotates towards open position, it, in turn, cams the latches outwardly through engagement of the ends of the hooks with the inwardly tapered upper end portion of the shoe 37. On the hooks reaching the substantially parallel sided intermediate portion of the shoe, the latches have been spread such that the fingers 44 are freed of the notches 42, releasing the plunger to normal position. A reverse camming action is exerted by the other end portion of the shoe on the latches, which eases return of the latter to normal position.

In order that the coupler may be closed without operation of the release plunger, the lower end portion of the shoe is more tapered than its opposite end so that the confronting edge of the tail can enter the space between the hooks when the latter are in normal or latching position. Interference of the hooks with closing is further minimized by inwardly bevelling their forward faces, so that any cocking of the knuckle will not affect its operation.

To operate the several parts of the hitch heretofore described, there is provided an operating or control lever 45, which may be mounted on the top of the casing 2 and carries a double-ended actuating or contact arm 46. As shown, one end of the arm normally overlies and is adapted to engage and depress one end of the shank locking bar 15, thereby lifting the detent 14 from one of the recesses 13 and enabling the shank of the coupler to shift longitudinally of its sleeve 5. The other end of the actuating arm, on the contrary, only overlies the release plunger 39 when the shank is fully telescoped and the stand 8 in down or erect position. Inadvertent movement of the double-throw lever 45 in either direction is prevented by suitable means, such as the illustrated balancing springs 47.

The operation of the hitch is relatively simple. Starting with the uncoupled position of Figure 1, the coupler shank 6 is seated fully within its sleeve 5 with the stand 8 in upright or erect position and the coupler 7 open, the ends of the actuating arm 46 then overlying both the shank locking bar 15, and the release plunger 39. The coupler being held at proper coupling height or level through its adjustable stand, it is only necessary to back the associated tractor such that its connecting link 24 will enter the coupling slot 23. On continued rearward movement of the tractor the knuckle 28 pivots to closed position in the manner previously described and is locked therein by the latches 32. The operating lever 45 is then swung backward to release the shank locking bar from the forward of the two recesses 13. On forward movement of the tractor and concurrent release by the operating lever the shank is withdrawn from its sleeve and the stand at the same time moves toward inoperative or collapsed position. This movement continues until the detent engages the rear of the two recesses 13 and locks the shank against further movement axially of the sleeve, this also locking the stand in inoperative position. When it is desired to uncouple the trailer to which the hitch has been applied the operating lever is first caused to release the shank locking bar and the tractor then backed, resulting in rearward movement of the shank and complementary downward movement of the stand until both have reached their initial positions of Figure 1 and been locked in these positions by engagement of the detent with the other recess. With the hitch now supported by its stand, the operating lever is thrown in the opposite direction to depress the release plunger and unlock the knuckle. Forward movement of the tractor then causes the knuckle to pivot to open position and, during such movement, to release or spring the plunger, resetting the latter. Held at coupling level by its stand and with the coupler unlocked, the trailer hitch is then prepared for recoupling whenever use of the trailer is desired. While the operating lever, as shown, must be operated from above the hitch, it may, of course, be connected through a suitable linkage such that it can be operated or thrown from the tractor.

From the above detailed description it will be apparent that there has been provided an improved trailer hitch which is automatic in operation, maintained at coupling level when uncoupled, and in which the supporting means is automatically moved into and out of supporting position on uncoupling and coupling of the trailer to which the hitch is applied. While described particularly with reference to trailers of the farm implement type, it will be apparent that the hitch of the present invention is of wide application and provides a rugged relatively simple device for coupling tractors and trailers. It should be understood that the described and disclosed embodiment is merely exemplary of the invention and that all modifications are intended to be included which do not depart either from the spirit of the invention or the scope of the appended claims.

Having now described my invention, I claim:

1. A trailer hitch comprising a casing for attachment to a draft bar of a trailer, a coupler having a knuckle, a collapsible support connected to said coupler, means for locking said knuckle in coupled position, means for locking said support in collapsed and extended positions, means engageable with said locking means and operable on locking of said knuckle to collapse said support, and a release member on said casing for unlocking said support and knuckle, said release member being operable to release said coupler only when said support is in supporting position.

2. A trailer hitch comprising a casing for attachment to a draft bar of a trailer, a coupler having a knuckle and having a shank slidably seated in said casing, a collapsible support pivotally mounted on said casing, connecting means for transmitting movement of said shank to said support, means for limiting the extent of such movement, means for locking said shank in positions corresponding to supporting and collapsed positions of said support, latch means on said coupler for locking said knuckle in coupled position, means on said coupler operative through said latch means for releasing said knuckle, and actuating means for unlocking said shank and actuating said knuckle release means, said actuating means being operable to actuate said knuckle releasing means only when said support is in supporting position.

3. In a trailer hitch, the combination of, a coupler having vertically spaced jaws including therebetween a coupling slot, a vertically pivotal knuckle mounted in said coupler, said knuckle having a nose for closing said coupling slot and a tail normally disposed inwardly beyond said slot, latch means carried by said coupler for locking said knuckle in slot closing position, trippable wedge means acting on and movable relative to said latch means for releasing said knuckle, and cam means on said tail and cooperating with said latch means for resetting said wedge means on pivoting of said knuckle to open position.

4. In a trailer hitch, the combination of, a coupler having vertically spaced jaws including therebetween a coupling slot, a knuckle mounted in said coupler and pivotal about a horizontal axis relative thereto, said knuckle having a nose and tail, said nose being movable into slot closing position, horizontally pivotal latch means carried by said coupler for engaging and locking said knuckle in slot closing position, yieldable wedge means cooperating with said latch means for releasing said knuckle, and cam means on said tail for engaging said latch means and restoring said wedge means to initial position on pivoting of said knuckle to open position.

5. In a trailer hitch, the combination of, a coupler having vertically spaced jaws including therebetween a coupling slot, a knuckle mounted in and pivotal vertically relative to said coupler for closing said slot, means engageable with said knuckle for locking said knuckle in slot closing position, wedging means for releasing said locking means, and cam means on said knuckle and cooperating with said locking means for restoring said releasing means to initial position on movement of said knuckle to open position.

6. A trailer hitch comprising a coupler movably mountable on a trailer, a collapsible support connected to and movable by said coupler to collapsed and extended positions, means associated with said coupler for locking said support in said positions, coupling means on said coupler, means for locking said coupling means in locked position, and release means common to and selectively engageable with both of said locking means for releasing said support and coupling means, said release means being operable to release said coupling means only when said support is in said extended position.

7. A trailer hitch comprising an automatic coupler movably mountable on a trailer, a collapsible support connected to and movable by said coupler to collapsed and upright positions, means mountable on said trailer for enabling said support to move to collapsed position on coupling of said coupler, and release means associated with said coupler and operable only when said support is in upright position for uncoupling said coupler.

8. A trailer hitch comprising a casing for attachment to a draft bar of a trailer, a coupler carried by and slidable relative to said casing, a collapsible support mounted on said casing and operatively connected to said coupler, coupling means on said coupler, means for locking said coupling means in coupled position, means associated with said casing for enabling said support to move to collapsed position, and means operative only on return of said support to supporting position for unlocking said coupling means.

9. A trailer hitch comprising a casing for attachment to a draft bar of a trailer, a coupler having a knuckle, said coupler being carried by and movable relative to said casing, a collapsible support mounted on said casing and connected to said coupler, means for locking said knuckle in coupled position, means connected to said casing for enabling said support to collapse, and means associated with said casing and operable only on return of said support to supporting position for unlocking said knuckle.

OLIVER JOHNSON.

REFERENCES CITED

The following references are of record in the file of this patent:

UNITED STATES PATENTS

| Number | Name | Date |
| --- | --- | --- |
| 1,033,766 | Stauson | July 23, 1912 |
| 1,060,441 | Engel | Apr. 29, 1913 |
| 1,898,854 | Reid | Feb. 21, 1933 |
| 2,089,493 | Land | Aug. 10, 1937 |
| 2,135,205 | Wilson | Nov. 1, 1938 |
| 2,256,310 | Braley et al. | Sept. 16, 1941 |
| 2,388,923 | Masters | Nov. 13, 1945 |

FOREIGN PATENTS

| Number | Country | Date |
| --- | --- | --- |
| 605,009 | France | May 18, 1926 |